2,818,906

ORGANOPOLYSILOXANE COMPOSITIONS CONTAINING BOTH LEAD- AND BUTYL-TIN-2-ETHYLHEXOATES AND GLASS FABRIC LAMINATES EMPLOYING THE SAME

Orville A. Braley, Midland, Mich., assignor to Dow Corning Corporation, Midland, Mich., a corporation of Michigan No Drawing. Application December 10, 1954
Serial No. 474,605

4 Claims. (Cl. 154—2.6)

This invention relates to the catalytic polymerization of organopolysiloxanes.

It has been known particularly in U. S. Patent No. 2,504,388 that combinations of lead 2-ethylhexoate and dibutyl-tin-diacetate are particularly good catalysts for siloxane molding compositions However, this combination of catalysts suffers from some disadvantages. One is that when mixed with the resin and allowed to stand there is a tendency for lead acetate to precipitate thereby reducing or destroying the catalytic activity of the material. In addition it has been found that a combination of the tin acetate and the lead 2-ethylhexoate whereas it gives commercially feasible molding compositions, still does not give molding compositions of specially high stress-strain.

It is the object of this invention to provide a novel combination of catalysts which will produce faster cure and give more satisfactory molded products than any catalyst heretofore employed with molding compositions. Another object is to provide a combination of metal catalysts which has an infinite shelf life. Other objects and advantages will become apparent from the following description.

This invention relates to a composition of matter comprising an organopolysiloxane resin having from 1 to 1.6 organic groups per silicon atom, from .01 to .2% by weight lead 2-ethylhexoate, and from .2 to .8% by weight of a compound of the formula

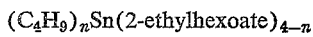

$(C_4H_9)_nSn(2\text{-ethylhexoate})_{4-n}$ in which $n$ is an integer from 1 to 3 inclusive. Both of the weight percentages are based on the weight of the resin.

Any organopolysiloxane resin in which the organic radicals attached to the silicon are monovalent hydrocarbon radicals or halogenated aryl hydrocarbon radicals can be employed in the composition of this invention. These include alkyl radicals such as methyl and octadecyl, alkenyl radicals such as vinyl and allyl, cycloaliphatic radicals such as cyclohexyl and cyclohexenyl, aromatic hydrocarbon radicals such as phenyl, tolyl and xenyl and halogenated radicals such as chlorophenyl, bromoxenyl and hexafluoroxylyl.

The preferred organic radicals are methyl and phenyl. Consequently, the preferred siloxane units employed in the resins of this invention are monomethylsiloxane, dimethylsiloxane, diphenylsiloxane, monophenylsiloxane and phenylmethylsiloxane. The resins of this invention may also contain limited amounts of $SiO_2$ units and siloxane units of the type $R_3SiO_{.5}$ in which R is a monovalent hydrocarbon radical or halogenated aryl hydrocarbon radical. In all cases the ratio of organic radicals to silicon should be within the above defined range.

The catalyst employed in this invention is a combination of lead 2-ethylhexoate with butyl-tin-tri-2-ethylhexoate, dibutyl-tin-di-2-ethylhexoate or tributyl-tin-2-ethylhexoate or mixtures thereof. In all cases the concentration of the lead 2-ethylhexoate must be between 0.1 and .2% by weight based upon the weight of the resin. The total weight of the tin compounds must be from .2 to .8% by weight based upon the weight of the resin This combination of catalysts produces results which are not obtainable with either the lead 2-ethylhexoate or the tin compounds alone and which is not attainable with any other known siloxane polymerization catalyst or combination of other catalyst. Siloxane resins which are polymerized with the catalyst combination of this invention possess a combination of flexibility, toughness, superior molding ability which makes them eminently useful for laminates and molding powders.

I desired, fillers may be employed in the compositions of this invention. These fillers may be powders such as diatomaceous earth, ferric oxide, titania, fume silica, clay or any other inorganic heat stable materials or they may be unwoven fibrous materials such as asbestos and glass fibers. In addition the compounds of this invention may be molded with woven fibrous materials such as glass or asbestos cloth. When employing the latter materials they are generally first impregnated with the siloxane resin-catalyst combination, given a short precure in order to render the resin tack free and to drive off any solvent and thereafter stacked and cured in the press as desired to give a unitary bonded structure composed of alternate layers of the glass or other fabric and the resin.

In general the curing of the compositions of this invention can be carried out at any desired temperature. Preferably the curing is carried out at temperatures between 150° C. to 250° C. and the molding operation is carried out at temperatures of from 150° to 200° C. at pressures of from 500 to 4,000 p. s. i.

The compositions of this invention when cured have excellent dielectric properties, thermal stability and chemical inertness This renders them eminently useful for the molding of electrical insulators, structural members and for other applications where thermal stability, mechanical strength and electrical resistance are needed.

The following examples are illustrative only and are not to be construed as limiting the invention which is properly delineated in the appended claims.

Example 1

Glass cloth was impregnated with a toluene solution of a siloxane resin having the composition 29.3 mol percent dimethylsiloxane, 32 mol percent monomethylsiloxane and 38.7 mol percent monophenylsiloxane which resin contained .5% by weight dibutyl-tin-di-2-ethylhexoate and .1% by weight lead 2-ethylhexoate both based on the weight of the resin. The impregnated glass cloth was then cured for a short time at 100° C. to remove the solvent and to render the resin tack free. At this stage the composition was composed of 45% by weight resin and 55% by weight glass cloth. The impregnated cloth was stacked in a laminate several layers thick and then molded 30 minutes at 175° C. at 1,000 p. s. i. The laminate was cooled to room temperature, removed from the press and further cured 6 hours at 250° C. The resulting material had a flexural strength of 40,000 p. s. i. at 30° C. and of 16,000 p. s. i. at 500° F.

Example 2

35% by weight of the resin composition of Example 1, 45% by weight glass cloth, 16% by weight diatomaceous earth and 4% by weight ferric oxide were mixed, precured to render the resin tack free and then molded 30 minutes at 175° C. at 1,000 p. s. i. The molded product was cooled, removed from the mold and then heated 6 hours at 250° C. The resulting material had a flexural strength substantially equal to that of Example 1.

*Example 3*

35% by weight siloxane resin having the composition 29.3 mol percent dimethylsiloxane, 32 mol percent monomethylsiloxane and 38.7 mol percent monophenylsiloxane and containing .18% by weight dibutyl-tin-di-2-ethylhexoate and .06% by weight lead 2-ethylhexoate both based on the weight of the resin was mixed with 45% by weight glass roving, 14% by weight diatomaceous earth, 4% by weight ferric oxide, 1% by weight calcium stearate and 1% by weight $Pb_3O_4$ and the resulting product was molded 10 minutes at 175° C. at a pressure of 4,000 p. s. i. The molded article was pulled from the mold while hot and was found to have a flexural strength of 30,000 p. s. i. and an impact strength of 12 foot pounds. The electrical properties of this material were excellent.

An identical composition except that the glass fibers were cut into short lengths, had a flexural strength of 17,000 p. s. i. and a tensile strength of 6,000 p. s. i. This composition also had excellent electrical properties.

*Example 4*

Equivalent results were obtained when butyl-tin-tri-2-ethylhexoate or tributyl-tin-2-ethylhexoate are substituted for the dibutyl-tin-di-2-ethylhexoate, in the composition of Example 1.

*Example 5*

Equivalent results are obtained when a siloxane resin having the composition 33⅓ mol percent monoethylsiloxane, 33⅓ mol percent monomethylsiloxane, 28⅓ mol percent monophenylsiloxane and 5 mol percent $$F_3CC_6H_4SiO_{1.5}$$

is substituted for the resin of Example 3.

That which is claimed is:

1. A composition of matter comprising an organopolysiloxane resin having on the average from 1 to 1.6 organic groups per silicon atom, said organic groups being selected from the group consisting of monovalent hydrocarbon radicals and halogenated aryl hydrocarbon radicals, from .01 to .2% by weight based on the weight of the resin of lead 2-ethylhexoate and from .2 to .8% by weight based on the weight of the resin of a compound of the formula $$(C_4H_9)_nSn(2\text{-ethylhexoate})_{4-n}$$

where $n$ is an integer from 1 to 3 inclusive.

2. A composition in accordance with claim 1 wherein the siloxane resin is a methylphenylsiloxane resin.

3. A laminate comprising a plurality of layers of glass fabric bonded and impregnated with an organopolysiloxane resin having an average from 1 to 1.6 organic groups per silicon atom, said groups being selected from the group consisting of monovalent hydrocarbon radicals and halogenated aryl hydrocarbon radicals, from .01 to .2% by weight based on the weight of the resin of lead 2-ethylhexoate and from .2 to .8% by weight based on the weight of the resin of a compound of the formula $$(C_4H_9)_nSn(2\text{-ethylhexoate})_{4-n}$$

where $n$ is an integer from 1 to 3 inclusive.

4. A laminate in accordance with claim 3 in which the siloxane resin is a methylphenylsiloxane resin.

References Cited in the file of this patent
UNITED STATES PATENTS

| | | |
|---|---|---|
| 2,449,572 | Welsh | Sept. 21, 1948 |
| 2,504,388 | Braley | Apr. 18, 1950 |
| 2,631,990 | Mack | Mar. 17, 1953 |